Jan. 8, 1963  J. BARTH ET AL  3,072,555
NUCLEAR PILES

Filed July 5, 1960  2 Sheets-Sheet 1

Inventors
J. BARTH &
E. ROCHE
By
Holcombe, Wetherill & Brisbois
Attorneys

United States Patent Office 3,072,555
Patented Jan. 8, 1963

3,072,555
NUCLEAR PILES
Jacques Barth and Edouard Roche, Paris, France, assignors to Societe Generale de Constructions Electriques & Mecaniques (Alsthom), Paris, France, a French body corporate
Filed July 5, 1960, Ser. No. 40,872
Claims priority, application France July 7, 1959
2 Claims. (Cl. 204—193.2)

The present invention relates to internal-boiling nuclear piles, and has for an object improvements therein.

In internal-boiling nuclear piles, the fluid delivered to the exterior thereof is generally composed of an emulsion of water and steam.

It is a more particular object of the invention to provide a novel pile which, in particular, allows drying and super-heating of the saturated steam in the interior of the pile.

The invention provides an internal-boiling nuclear pile, comprising hollow cylindrical fuel elements whose internal bore constitutes a coolant channel, the said elements comprising a lower portion where the boiling of the coolant takes place, an intermediate portion where the liquid phase is separated from the vapour phase of the coolant, and an upper portion where the coolant vapour is super-heated, a moderator located outside said fuel elements, said coolant and said moderator consisting of water, hermetic closure means in the moderator region at a level located immediately above said intermediate portion of said elements in order to define a lower region in which the moderator surrounds said lower portion of the fuel elements and an upper region in which the moderator surrounds said upper portion of the fuel elements, means for admitting cold water into said upper region, means for slightly heating said cold water in said upper region, and external conduits for passing the slightly heated water by gravity from said upper region into said lower region, means for further heating of said water in said lower region, means for admitting the thus further heated water to the bottom of the said coolant channel, so that said water is partially vapourised in said lower portion of the fuel elements, means for evacuating the vapourised water into the said intermediate portion and means causing the dry vapour to rise into the said upper portion for super-heating.

Good thermal contact must be realised between the coolant and the fuel and the latter must be thermally isolated as well as possible from the moderator.

The cooling channels are steam generators in their lower part and steam super-heaters in their upper part.

Figure 1:
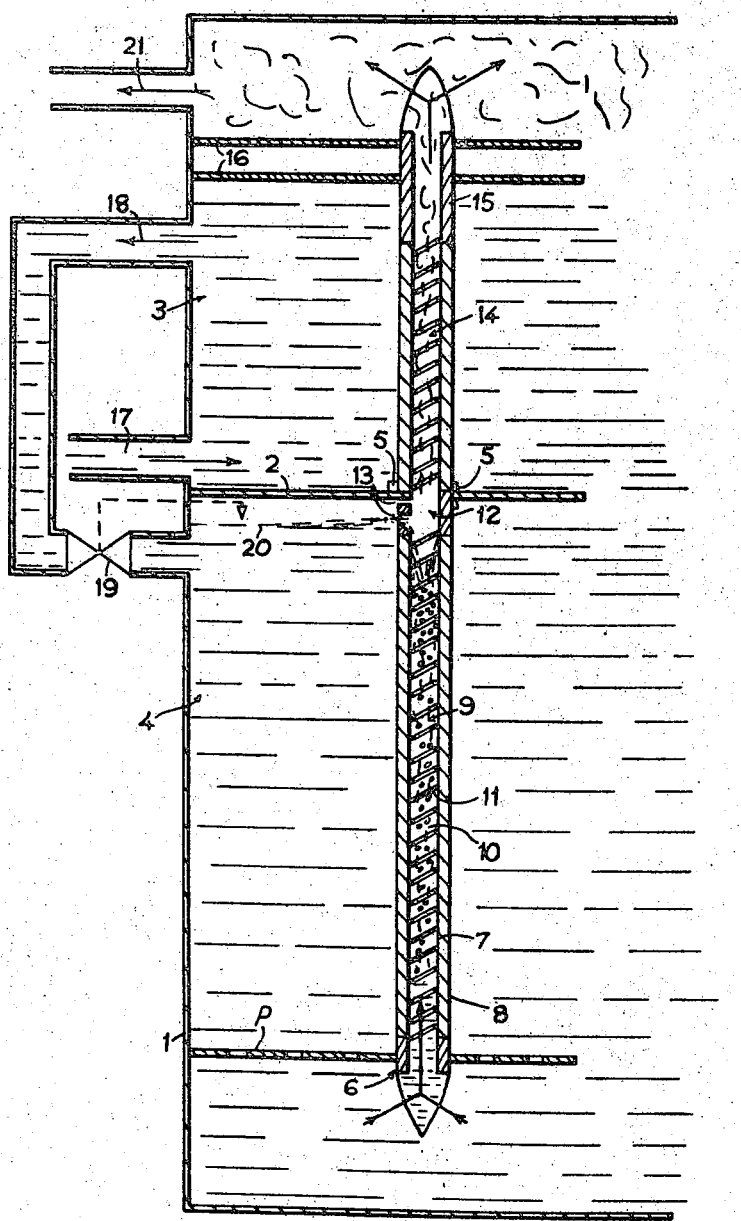
Figure 2:
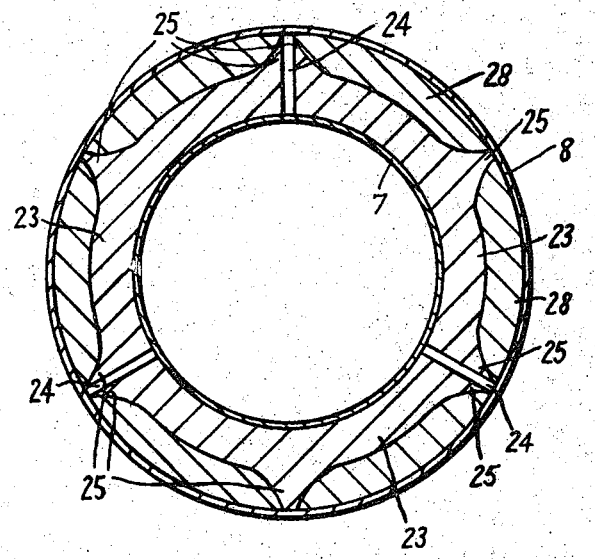
Figure 3:
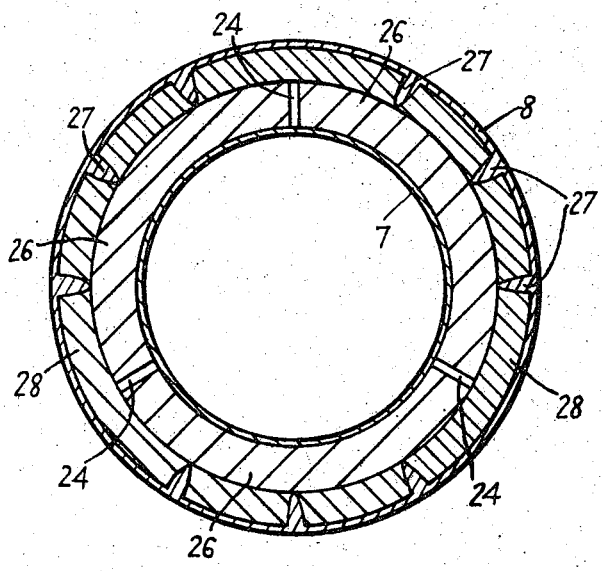

In order that the invention may be more clearly understood, reference will now be made to the accompanying drawings which schematically show one embodiment thereof by way of example, and in which:

FIGURE 1 shows an axial section through part of a pile according to the invention, FIGURE 2 shows a cross-section through one form of fuel element for use in the pile of FIGURE 1, and FIGURE 3 shows a cross-section through another form of fuel element.

The pile according to the invention, shown in FIGURE 1, comprises a chamber, part of which is shown as 1, and carries horizontally a plate 2, of a material which does not absorb neutrons, separating the super-heating zone 3 and the boiling zone 4. This plate 2 comprises labyrinths 5 allowing the passage of the fuel elements and constituting hermetic sealing means.

The fuel elements are shown schematically in FIGURE 1, and comprise a supporting part 6 serving for the positioning of the elements, permitting the entry of the cooling water and ensuring the union between the covers 7 and 8 enveloping the fuel. The fuel elements may be supported in known fashion by a perforated plate P which receives the supporting part 6 and is secured to the wall of chamber 1 in any desired fashion. The fuel elements also have a vapourisation fuel part 9 with an interior channel 10 serving for the passage of the cooling water, forced into rotation by the system of helicoidal ribs 11; an intermediate part 12 comprising parts 13 for the evacuation of the unvapourised water and the equalisation of the vapour pressures; a super-heating fuel part 14 similar to the evaporation fuel part, but capable of being of smaller diameter; and a terminal part 15 not containing any fuel intended to separate the cold moderator zone from the super-heated steam zone and further comprising the suspending system for the fuel elements. The fuel elements are described in greater detail in FIGURES 2 and 3.

At its upper part, the pile carries two plates 16 serving to isolate the super-heated steam from the moderator being cooled.

The cooled water arrives through an inlet 17 to the peripheral part of the fuel elements of the super-heating zone 3. It is heated a little, receiving only a very small portion of the flux which super-heats the steam, and it serves as the moderator for the super-heating part. Then it leaves through an outlet 18 to enter into the zone 4 through several valves or gates shown schematically at 19, assuring the maintenance of the level 20 in the boiling zone of the pile; it is heated during its descent around the fuel elements, without or with a very small production of steam which would pass through the equilibrium ports 13.

The water then enters into the channel 10 where it is partially vapourised, the unvapourised leaving through the ports 13, whilst the dry steam goes on to be super-heated in the part 14 and to leave the pile at 21.

It is known that an auto-regulation of the piles can be obtained by a sub-cooling of the feed water in the case of an increase in the power required; in order to utilise this auto-regulation in the pile, the feed water can be divided into two parts: one part passing, as has just been described, to the moderating zone of the super-heating part 3 and maintaining a constant level (equilibrium of leaks and systematic losses) in the zone 4, and another part being directed to various parts of the moderator of the boiling zone 4 so that one can benefit from its auto-regulation role.

FIGURES 2 and 3 represent, in section perpendicular to the axis of the elements, two examples of fuel elements for nuclear piles or reactors according to the invention. These elements are contained between an interior cover 7 and an exterior cover 8 as referred to above. The fuel, for example uranium oxide, is in the form of a ring divided into three parts 23 with a gap 24 between each for expansion. The fuel is forced against the cover 7 by bearing against the cover 8.

The supporting of the parts 23 of uranium oxide on the exterior cover 8 is obtained in two different ways in these two figures.

In FIGURE 2, the calcined uranium elements have stumps 25 in contact with the exterior cover 8. In FIGURE 3, the uranium oxide elements are portions 26 of a cylinder and do not have any stumps, the spacing of the fuel element from the exterior cover being ensured by several longitudinal blades 27 integral with the exterior cover 8.

In the two cases, the spaces between the exterior cover and the fuel element can, according to the case, be filled with non-absorbent bodies 28, for example of magnesia, to provide thermal isolation, or they can be left empty.

In a particular case, an operating calculation with a fuel element of 3 mm. thickness and an isolating zone of 2 mm. of magnesia, has shown that, for a heat flux of 100 w./cm.² on the interior cover held at 300° C. by the production of steam with super-heating, the extreme temperatures of the uranium oxide will be of the order of 550° C. and 1050° C., and that the heat flux passing through the exterior cover held at 200° C. will only be 4 w./cm.². This calculation has been made in the case of a cartridge filled with a gas having the conductivity of carbon dioxide gas. With a cartridge filled with helium, the interior equilibrium temperatures will be lowered and the proportion of the heat flux between the interior and the exterior will be lowered a little.

We claim:

1. An internal-boiling nuclear pile comprising hollow cylindrical fuel elements whose internal bore constitutes a coolant channel, the said elements comprising a lower portion where the boiling of the coolant takes place, an intermediate portion where the liquid phase is separated from the vapour phase of the coolant, and an upper portion where the coolant vapour is super-heated, a moderator located outside said fuel elements, said coolant and said moderator consisting of water, hermetic closure means in the moderator region at a level located immediately above said intermediate portion of said elements in order to define a lower region in which the moderator surrounds said lower portion of the fuel elements and an upper region in which the moderator surrounds said upper portion of the fuel elements, means for admitting cold water into said upper region, means for slightly heating said cold water in said upper region, and external conduits for passing the slightly heated water by gravity from said upper region into said lower region, means for further heating of said water in said lower region, means for admitting the thus further heated water to the bottom of the said coolant channel, so that said water is partially vapourised in said lower portion of the fuel elements, means for evacuating the vapourised water into the said intermediate portion and means causing the dry vapour to rise into the said upper portion for super-heating.

2. An internal-boiling nuclear pile comprising a chamber, a plate of a material which does not absorb neutrons separating said chamber into upper and lower regions, sealing means in said plate, hollow cylindrical fuel elements, internal helical ribs in said fuel elements constituting a coolant channel, said fuel elements passing through said sealing means and comprising, below said plate, a lower portion where the coolant is vapourised and an intermediate portion having openings for evacuation of the liquid phase of the coolant which is given a rotary movement by said helical ribs, and to equalise the vapour pressures between the inside and the outside of said fuel element, and above said plate, an upper portion where the coolant vapour is super-heated, fuel-element-supporting means in the said lower portion of said chamber, plates disposed at the top of said upper portion of said chamber to insulate the latter from the super-heated coolant vapour coming from the fuel elements, means for hanging the said fuel elements from said plates, said upper region of said chamber having coolant entrances and exits, entrance means for said coolant coming from the said upper region into said lower region of said chamber and whence said coolant penetrates into said fuel elements, said coolant acting as a moderator in both said upper and lower regions of said chamber.

No references cited.